Nov. 13, 1962 M. C. STEELE ETAL 3,064,210

HARMONIC GENERATOR

Filed Oct. 25, 1957 4 Sheets-Sheet 1

INVENTORS
MARTIN C. STEELE &
ARIE L. EICHENBAUM
BY Charles H. Brown
ATTORNEY

INVENTORS
MARTIN C. STEELE &
ARIE L. EICHENBAUM
BY Charles H. Brown
ATTORNEY

Nov. 13, 1962 M. C. STEELE ETAL 3,064,210

HARMONIC GENERATOR

Filed Oct. 25, 1957 4 Sheets-Sheet 3

INVENTORS
MARTIN C. STEELE &
ARIE L. EICHENBAUM
BY Charles H. Brown
ATTORNEY

Nov. 13, 1962 | M. C. STEELE ET AL | 3,064,210

HARMONIC GENERATOR

Filed Oct. 25, 1957 | 4 Sheets-Sheet 4

INVENTORS
MARTIN C. STEELE &
ARIE L. EICHENBAUM
BY Charles H. Brown
ATTORNEY

United States Patent Office 3,064,210

Patented Nov. 13, 1962

3,064,210

HARMONIC GENERATOR

Martin C. Steele, Princeton, N.J., and Arie L. Eichenbaum, Levittown, Pa., assignors to Radio Corporation of America, a corporation of Delaware Filed Oct. 25, 1957, Ser. No. 692,304

9 Claims. (Cl. 332—52)

The invention relates to harmonic generators and particularly to a harmonic generator which depends for its operation on the sudden change in resistivity of certain types of semiconductors under predetermined conditions of applied electric field and ambient temperature.

A general object of the invention is to provide an improved harmonic generator having advantages which cannot be realized by the use of the various types of harmonic generators previously known.

Another object is to provide an improved harmonic generator capable of handling much greater instantaneous power, pulses of greater width and a larger amount of continuous power for a given input signal than the various types of harmonic generators previously known.

A further object is to provide a novel harmonic generator including an extrinsic type of semiconductor device.

A still further object is to provide a novel harmonic generator including a semiconductor device readily adaptable for use in applications where high power switching is involved and low leakage is desirable.

A still further object is to provide an improved harmonic generator including a semiconductor device which is simple in operation and construction, depending for its operation on components of small size and weight.

A still further object is to provide an improved harmonic generator including an extrinsic type of semiconductor device which is readily adaptable for use as an amplitude modulator.

Semiconductors have relatively high resistivities at room temperature as compared to metals. Most semiconductors display a marked increase in resistivity at very low temperatures. This is particularly true for extrinsic type semiconductors whose electrical properties depend upon the presence of impurity substances defined in the art as donor and acceptor impurities. At low temperatures, the electric charge carriers, holes or electrons, present in extrinsic types of semiconductors attain relatively high mobilities. Mobility is a parameter of a charge carrier and is defined as the ratio of the charge carrier drift velocity to an electric field applied to the semiconductor.

In a condition of high mobility, a relatively small electric field, of the order of a few volts per centimeter, can impart enough energy to the electric charge carriers, which are electrons or holes, to cause "impact ionization" of the donor impurities in the case of electrons and of the acceptor impurities in the case of holes. The term "impact ionization," as used here, refers to a phenomenon in which an atom of an impurity substance has been struck by a charge carrier, a hole or an electron, moving under the stimulus of an electric field, and which has thereby lost an electron or hole and become an ion.

When "impact ionization" occurs, the resistivity of the semiconductor sharply decreases. This sudden change in resistivity which is defined as the breakdown of the semiconductor results in a sharp change in the output current to input voltage characteristic of the semiconductor. The sudden decrease in resistivity causes a substantial increase in the flow of current through the semiconductor.

According to the invention, a harmonic generator is provided including a semiconductor device which exhibits a sharp change in resistivity due to "impact ionization" under predetermined conditions of temperature and applied field. The temperature and applied field are adjusted to values such that further change in the applied field results in the occurrence of the sharp change in resistivity. The applied field is thereafter varied according to an input signal to an extent sufficient to cause the sharp change in resistivity during at least a portion of the duration of the signal. Since the "impact ionization" of impurities in the semiconductor gives rise to sharp non-linearities in the current-voltage characteristic, high power rectification may be accomplished over a wide range of frequencies. The resulting harmonic content of relatively high power permits generation of higher frequencies than the input signal frequency. It is possible to generate high powers up to and including microwave frequencies. Suitable filtering and/or other frequency selecting means according to the particular application are included in the generator and arranged to select a desired harmonic frequency produced by the invention by application to a utilization circuit. A feature of the invention is the adaptability thereof to a modulation system in that the selected harmonic frequency can be readily amplitude modulated according to modulating signal energy supplied from a suitable source.

A more detailed description of the invention will now be given in connection with the accompanying drawing, in which.

Similar reference characters are applied to similar elements throughout the figures of the drawing.

Figure 1:
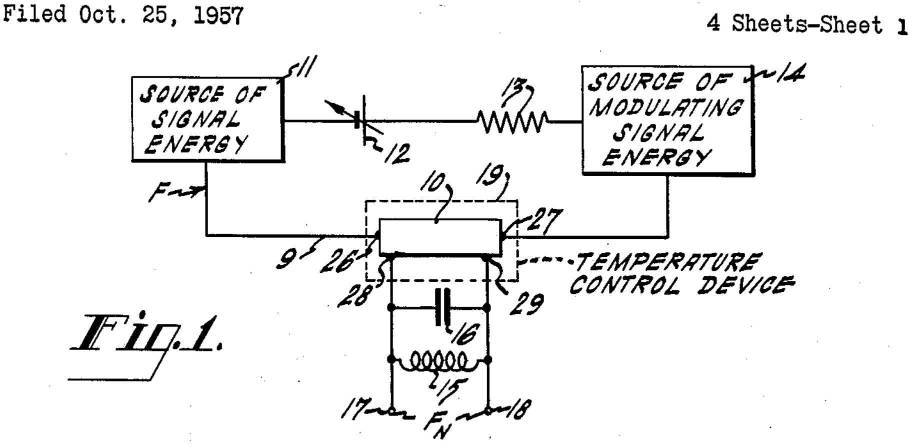
FIG. 1 is a circuit diagram of one embodiment of a harmonic generator constructed according to the invention.

Referring to FIGURE 1, a body of semiconductive material 10 is connected by means of a lead 9 in series with a source of signal energy 11 of given frequency F, a source of unidirectional potential represented by an adjustable battery 12, a loading resistor 13 and a source of modulating signal energy 14. As understood in the art, the resistor 13 may be made variable, permitting the use of a fixed battery 12 if desired. The semiconductive material 10 is one of the types which has a relatively steep resistivity versus temperature characteristic and in which the resistivity sharply changes under certain conditions of applied voltage and ambient temperature. Crystalline semiconductive materials such as N or P-type germanium, N and P type germanium-silican alloys, N or P-type silicon and P-type indium antimonide may be used.

The semiconductor 10 includes impurity substances by which an excess of charge carriers can be made available to effect current flow therethrough. Such a semiconductor is referred to as being of the extrinsic type and is to be distinguished from the intrinsic type of semiconductor whose electrical properties are determined completely by the pure semiconductor. A feature of the semiconductor body 10 is that it is of one type only, as contrasted to other semiconductor devices which contain at least two different types of semiconductive material such as transistors, junction diodes and point contact diodes.

Two types of impurities may be present in the extrinsic type of semiconductor 10. If, for example, antimony, arsenic or phosphorus are present, an excess of electrons are free to move about within the semiconductor 10. By virtue of the negative charges which the electrons bear, current will flow within the semiconductor. The impurities which result in an excess of free electrons are known as the donor impurities, and semiconductors containing such impurities are termed N-type.

If, on the other hand, indium, gallium or aluminum, for example, are present in the semiconductor body 10, each of these impurities can be made to create a positively charged region into which a free electron can flow. An excess of holes will be present, the acceptance of the electrons resulting in a flow of current. Impurities of this type are referred to as acceptors, and semiconductors containing such impurities are termed P-type. Either the N-type or P-type of semiconductor can be made to conduct equally well in either direction. However, in the case where a semiconductor includes both N and P-type regions within its structure, current can flow readily in one direction only.

The semiconductor body 10 may be of any size and shape necessary to meet the requirements of a particular application, as will become apparent from the various embodiments of the invention to be described. By way of example only, it has been found practicable to use a semiconductor body 10 which is two millimeters by one millimeter in cross section and one centimeter (or ten millimeters) in length. In order to provide clarity in the drawing, the semiconductor body 10 has been shown in FIG. 1 and in the other figures of the drawing greatly enlarged. The lead 9 is connected to opposite ends of the semiconductor body 10 at points 26, 27 located along the long dimension or longitudinal axis thereof by any of known techniques. The connections 26, 27 may be made by soldering to vapor deposited metal coatings on the semiconductor body 10 or to coatings formed of a cured silver paste.

A parallel tuned resonant circuit comprising an inductor 15 and capacitor 16 is connected between two spaced points 28, 29 arranged on a larger or side surface area of the semiconductor body 10. The surface to which the tuned circuit is connected is located at right angles with respect to the two end surfaces to which the lead 9 is connected. The tuned circuit may be connected to the semiconductor body 10 at the spaced points 28, 29 by any of the techniques referred to above in connection with lead 9. The tuned circuit is set to be selective to a particular harmonic frequency $F_N$ of the fundamental frequency F supplied by the source 11. A pair of output terminals 17, 18 are connected to the opposite ends of the inductor 15 such that the selected frequency $F_N$ is available at the terminals 17, 18 for application to a utilization circuit.

The semiconductor body 10 is located in a low temperature environment indicated schematically by the dashed box 19. The box may represent a liquid helium cryostat or other means for maintaining body 10 at a low temperature. Liquid helium liquefiers are commercially available as are double Dewar flasks which use liquid nitrogen in the outer Dewar and liquid helium in the inner Dewar, and lose less than 1% of their liquid helium per day. Where a material such as germanium is used as the semiconductor 10, an upper temperature limit of 25–32° Kelvin (K.) is feasible, although lower temperatures may be employed. For a semiconductive material such as silicon an upper temperature limit, which is approximately that of liquid nitrogen such as 80° K., may be used. However, liquid hydrogen or liquid helium temperatures are generally preferred. It is believed to be unnecessary to discuss in detail the means for maintaining the semiconductive material at low temperatures. These are described, in general, in the article entitled "Low Temperature Electronics" in the Proceedings of the IRE, volume 42, pages 408, 412, February 1954, and in other publications.

Figures 2, 3:
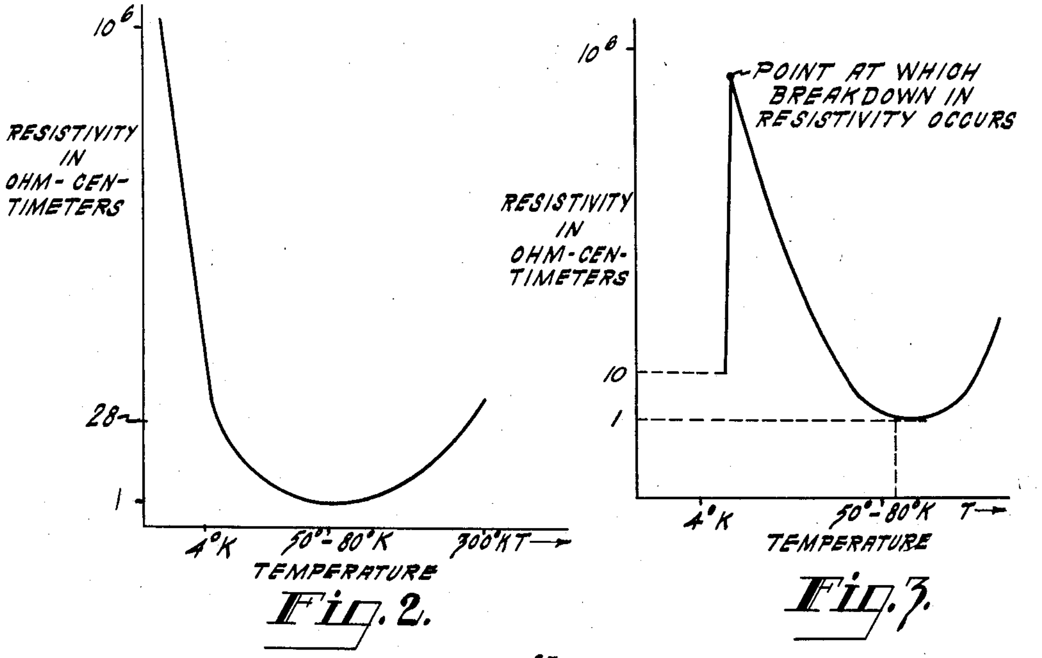
FIGS. 2, 3 and 4 are curves used in describing the operation of the embodiment of the invention given in FIG. 1.

In describing the operation of the invention, reference will be made to FIGS. 2, 3 and 4, as well as to FIG. 1. FIG. 2 shows how the resistivity of a body of extrinsic type semiconductive material such as a particular sample of germanium varies with temperature in the presence of electric fields less than that required to produce "impact ionization" or the breakdown of the material. Absolute temperature T is plotted as the abcissa and the logarithm of the resistivity is plotted as the ordinate. At room temperature, this sample of germanium has a resistivity of approximately 28 ohm-centimeters. The resistivity reaches a minimum value at a temperature of about 50 to 80° K. and then rises rapidly to approximately $10^6$ ohm-centimeters at about 4° K. Note that at very low temperatures only a relatively small increment in temperature is required to rapidly change the resistivity.

FIG. 3 is a curve showing how the resistivity of the same sample of semiconductive material shown in FIGURE 2 varies with temperature when an electric field—say one produced by applying 10 volts from the battery 12 and resistor 13 to the semiconductor body 10 in the embodiment of FIGURE 1 is applied to the sample after its temperature has been lowered to a value at which breakdown can occur. Down to a temperature of about 20° K. the curve is exactly the same as the one shown in FIGURE 2. However, when the temperature is reduced further, and thereafter, the electric field is applied, the charge carriers, holes or electrons, attain such high mobilities from the electric field that they cause "impact ionization" of the donor or acceptor impurities. When this occurs, the high value of resistivity, which may be on the order of $10^6$ ohm-centimeters (the exact value depending on the temperature of the sample prior to breakdown), changes extremely sharply to a very low value of resistivity on the order of 10 ohm-centimeters. The sudden increase in free, excess electrons in the case of donor impurities or the sudden increase in free, excess holes in the case of acceptor impurities results in both cases in a sharp rise in the current flow through the semiconductor body 10.

Figure 4:
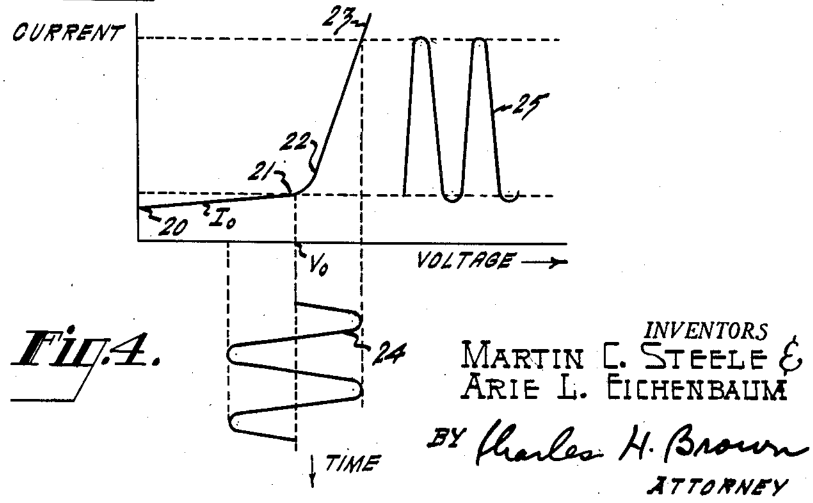

FIGURE 4 is a curve of the output current versus applied voltage characteristic of a typical semiconductor body 10, demonstrating the effect of "impact ionization" and the resulting sudden decrease in resistivity. Assume that the semiconductor body 10 of FIGURE 1 is made of germanium with either donor or acceptor impurities and that the temperature maintained by the device 19 is on the order of 10° K. During the portions 20, 21 of the curve, the resistivity of the semiconductor body 10 is high. A relatively large change of input voltage applied to the semiconductor body 10 under these conditions causes practically no change in the output current $I_0$ of the body 10. However, the resistivity changes sharply upon the breakdown of the semiconductor body 10, and a sharp change in output current $I_0$ occurs between the points 21, 22 on the curve. The remainder of the curve 22, 23 is extremely steep so that a relatively small change in voltage during the portion 22, 23 of the curve results in a large increase of the output current $I_0$.

In the operation of the embodiment of the invention shown in FIG. 1, the temperature of the semiconductor body 10 is adjusted by the device 19 to a point such that the semiconductor body 10 exhibits high resistivity in the manner shown on the curve of FIG. 2. The battery 12 is adjusted to supply a sufficient bias voltage $V_0$ such that the semiconductor body 10 is at or near the breakdown point. If the source 11 is now operated to supply an input signal of frequency F in the range, for example, of direct current to fifty megacycles per second, the semiconductor body 10 will be periodically driven into the region of low resistivity during one-half of each cycle of the input signal. A high output current will appear across the resistor 13 during the periods of low resistivity. The input signal is shown in FIG. 3 as a sine wave 24, and the output signal is shown as a rectified wave 25.

The "impact ionization" of the impurities in the semiconductor body 10 will in the manner shown on the curve of FIG. 3 give rise to sharp non-linearities in the current versus voltage characteristic of the material used. The characteristic is of odd symmetry so that without a direct current bias there would be no rectification of an alternating current signal. However, with a direct current bias to a point at or near the breakdown point of the semiconductor body 10, the forward and reverse resistances are different and rectification will result. It has been found that the direct current characteristic or component can be represented by an exponential of the type $$I—Ae^{\alpha V} \qquad (1)$$

where $I$=current; $V$=voltage and A and $\alpha$ are constants.

From Equation 1 it follows that if V is an alternating current voltage given by $V=V_1 \cos \omega t$, where $\omega$=angular frequency and $t$=time; then $$I=Ae^{\alpha V_1 \cos \omega t} \qquad (2)$$

Equation 2 can be represented in terms of Bessel functions through known expansions as are, for example, described in "Bessel Functions for Engineers"—McLachlan, Oxford University Press, pages 105–106, and other publications. Thus, it follows that $$I=A\left[J_0(-i\alpha V_1)+2\sum_{N=1}^{a} i^N J_N(-i\alpha V_1)\cos^N \omega t\right] \qquad (3)$$

where $J_0$ is the Bessel function of the first kind of zero order; $J_N$ is of the $N^{th}$ order, and $i$ is the imaginary coefficient $\sqrt{-1}$. In Equation 3, the term $AJ_0(-1\alpha V_1)$ corresponds to the direct current component of the current. The term in $J_1$ is the current amplitude of the fundamental frequency supplied by the source 11, $J_2$ is the current amplitude of the second harmonic frequency, and so on. It is possible to compute the amplitude of any harmonic of the fundamental frequency from the Equation 3. The magnitude of these quantities can be demonstrated by the following table:

| $\alpha V_1$ | $J_0(-i\alpha V_1)$ | $+iJ_1(-i\alpha V_1)$ | $-J_2(-i\alpha V_1)$ |
|---|---|---|---|
| 0 | 1.000 | 0 | 0 |
| 1 | 1.266 | 0.565 | 0.136 |
| 2 | 2.280 | 1.591 | 0.689 |
| 3 | 4.881 | 3.955 | 2.245 |
| 4 | 11.302 | 9.760 | 6.422 |
| 5 | 27.240 | 24.336 | 17.506 |

From the table it can be seen that if, for example, $\alpha V_1$ (the voltage amplitude of the fundamental frequency applied to the semiconductor body 10 times the constant $\alpha$) equals the factor of three, the amplitude of the second harmonic (2 times 2.245 or 4.490) is fifty-seven percent as large as the amplitude of the fundamental frequency (2 times 3.955 or 7.910), and so on. The harmonic frequencies produced are of relatively high power such that they can be readily and selectively recovered by practical circuits.

In the embodiment of FIGURE 1, the fundamental and harmonic frequencies of different wavelengths will be present along the surface of the semiconductor body 10. The tuned circuit including the inductor 15 and capacitor 16 is connected to the body at the spaced connecting points 28, 29 which are located according to the wavelength or harmonic frequency to be selected and to which the tuned circuit is tuned. The selected frequency $F_N$ is made available at the output terminal 17, 18 for application to a utilization circuit. As indicated in the table given above, the number of the harmonic frequency which it is possible to recover will depend on the voltage amplitude of the fundamental frequency signal F supplied by the source 11. The voltage amplitude of the frequency signal F can be adjusted according to the characteristic of the particular material used for the semi-conductor body 10 to provide the most desirable operation at the harmonic frequency desired. If a lower harmonic frequency is selected, the voltage amplitude of the frequency signal F may be held at a relatively low level. If a higher harmonic frequency is desired, the voltage amplitude of the frequency signal F may be raised an amount such that the harmonic frequency selected is of sufficient power to be recovered for application to a utilization circuit. A harmonic generator is disclosed which is capable of high power harmonic frequency generation. Because of the sharp non-linearities in the voltage versus current characteristic of the semi-conductor body material used, there is provided by the invention a practical, efficient and highly harmonic frequency generator readily adaptable for use in a wide range of applications.

It has been assumed that the source 11 of the embodiment given in FIG. 1 is arranged to supply an unmodulated input in the form of a sine wave signal. In practice, the source 11 may be arranged to supply an input signal of any form desired. The source 11 may supply signal energy in the form of a pulse train or in any other form known in the art capable of rectification. Further, the signal energy supplied by the source 11 may be modulated according to certain intelligence. Phase, amplitude, frequency or other known types of modulation may be used. Since the invention exhibits in its operation such sharp non-linearities in the current versus voltage characteristic, the harmonic frequencies produced will be modulated in a faithful manner according to the modulation of the input signal supplied by the source 11. The output wave 25 shown in FIG. 4 will closely follow the variations in the input signal 24 supplied by the source 11. A harmonic frequency signal $F_N$ modulated in the same manner as the fundamental frequency signal F will appear at the terminals 17, 18 for application to a utilization circuit.

It has been indicated that, assuming the bias voltage supplied by the battery 12 is fixed at a value $V_0$ at or near the breakdown point of the semiconductor body 10, the voltage amplitude of the signal supplied by the source 11 may be varied according to the operation desired. In certain applications it may not be practical to vary the voltage amplitude of the input signal, and/or the voltage amplitude of the input signal may be maintained within fixed limits.

In such applications the battery 12 may be adjusted so that the semiconductor body 10 is biased at a point located at any point along the curve shown in FIG. 3. If an input signal of relatively high voltage amplitude is supplied, the bias voltage may be adjusted to a point in the region 20, 21 of the curve, the particular point being determined by the voltage amplitude of the incoming signal and the particular harmonic frequency to be made available. If an input signal of relatively low voltage amplitude is supplied, the bias voltage may be adjusted to a point in the breakdown region 21, 22 of the semiconductor body 10 or, in some cases, in the region 22, 23 of rapid current change, and so on. If a sufficient amount of power is supplied by the source 11, the battery 12 may be eliminated altogether. In this case, the voltage amplitude of the input signal would itself be sufficient to exceed the breakdown point of the semiconductor body 10 during at least the peak periods of the input signal. It is necessary only that the bias voltage should be set so that the difference between the breakdown point of the semiconductor body 10 and the bias voltage is less than the voltage amplitude of the fundamental frequency signal supplied by the source 11. The bias voltage and the input signal voltage amplitude can be determined in relation to one another to provide the operation desired.

A source of modulating signal energy 14 such as tone, voice or other type of modulating signal energy is shown connected in the input circuit of the semiconductor body 10 in the embodiment given in FIG. 1. Assuming that the input signal supplied by the source 11 is unmodulated and of given voltage amplitude, a modulating signal supplied by the source 14 will cause the bias voltage applied to the semiconductor body 10 to vary according to the intelligence of the modulating signal. An amplitude modulation system is provided in that the amplitude of the rectified output wave will be determined at any particular time according to the amplitude of the modulating signal energy or bias voltage applied to the semiconductor body 10. In other words, the difference between the breakdown point of the semiconductor body 10 and the bias voltage will vary as a function of the modulating signal energy, resulting in the peaks of the input signal supplied by the source 11 reaching correspondingly varying points beyond the breakdown point on the curve given in FIG. 3. By using the proper biasing voltages, it is possible to obtain substantially one hundred percent modulation by operating the semiconductor body 10 entirely within the portion or region 22, 23 of the curve in which rapid change in current occurs. Since a rapid change in current does occur, it is possible to operate in this manner without destroying the semiconductor body 10 by overheating, and so on. The battery 12 is adjusted according to the amplitude of the modulating signal energy so that the proper biasing levels are maintained. If the amplitude of the modulating signal energy supplied by the source 14 is sufficient, the battery 12 may, of course, be eliminated.

If a modulated signal is supplied by the source 11 and a variable bias voltage is applied to the semiconductor body 10 according to the modulating signal energy supplied by the source 14, a double modulation system is provided. The selected output harmonic frequency signal of the invention will be modulated in the manner of the input signal supplied by the source 11 and will also be amplitude modulated according to the modulating signal energy supplied by the source 14.

Figure 5:
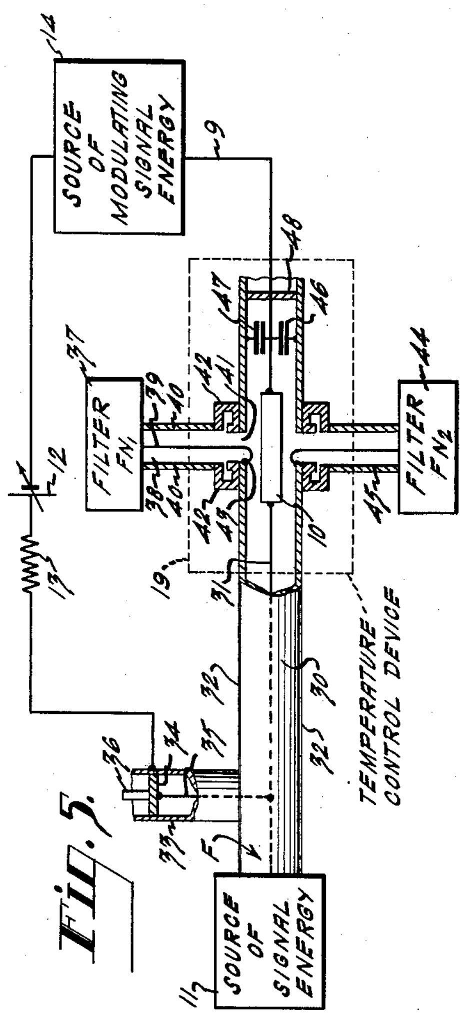
FIG. 5 is a circuit diagram of another embodiment of the invention as applied to a coaxial line arrangement.

FIG. 5 shows an embodiment of the invention as applied to a coaxial line arrangement. The source of signal energy 11 is arranged to supply an input signal of given frequency F over a coaxial line section 30 having an inner conductor 31 and an outer conductor 32. The semiconductor body 10 is connected in the inner conductor 31 by soldering or by similar means such that one end of the semiconductor body 10 is connected to the source 11 over the inner conductor 31. The other end of the semiconductor body 10 is connected over the inner conductor 31 to a conventional radio frequency short or termination for the coaxial line 30 in the form of the distributed capacitance of the line 30, represented by capacitors 46 and 47, and a metallic disc 48 of resistive material.

The inner conductor 31 is connected through the termination to the outer conductor 32 at a short circuit arrangement 33 over an electrical path including lead 9, the source of modulating signal energy 14, adjustable battery 12 and resistor 13. The short circuit 33 consists of an adjustable disc or metallic resistive member 34 arranged between and in electrical engagement with a pair of open ends of the outer conductor 32. The metallic member 34 is connected to the inner conductor 31 by a short lead 35 to provide a direct current path through the semiconductor 10 from the biasing means represented by the battery 12 and/or the source of modulating signal energy 14. The metallic member 34 is adjusted by means of a rod or similar member 36 so as to provide the proper matching of the impedance of the semiconductor body 10 with that of the line 30. The semiconductor body 10 is maintained in a temperature controlled atmosphere by the control device 19.

A first output circuit is provided including a filter circuit 37 arranged to be selective to a harmonic frequency $F_{N_1}$. The filter circuit 37 is connected to the coaxial line 30 by a coaxial line section 38 having an inner conductor 39 and an outer conductor 40. The inner conductor 39 of the coaxial line 38 passes through a window or slot 41 in the coaxial line 30 and is connected to the outer conductor 32 of the coaxial line 30 so as to form a magnetic coupling loop 43 which extends into the coaxial line 30 adjacent the surface of the semiconductor body 10. The outer conductor 40 of the coaxial line 38 is connected to the outer conductor 32 of the coaxial line 30 through a conventional metallic choke 42. The choke 42 serves to electrically cancel out the discontinuity or interruption presented in the coaxial line 30 by the window 41 for the fundamental radio frequency signal F. The choke 42 is commonly made one-half wavelength long at the fundamental frequency F and prevents the propagation of the fundamental frequency F in the coaxial line 38.

The operation of the embodiment shown in FIG. 5 is similar to that of the embodiment of FIG. 1 already described. The semiconductor body 10 is maintained at a proper temperature by the device 19 in relation to the bias voltage supplied by the battery 12 and the material used such that the semiconductor body 10 is held at or near the high point of resistivity thereof. When the input signal of a frequency F in the range, for example, of fifty to three thousand megacycles per second is fed from the source 11 to the semiconductor body 10 over the coaxial line 30, "impact ionization" of the impurities in the semiconductor body 10 occurs during at least the peak periods of the input signal. The sharp non-linearities in the voltage versus current characteristic of the material used as shown in the curve of FIG. 4 results in the rectification of the input signal. The fundamental frequency signal F and a number of harmonic frequency signals $F_N$ of different wavelengths are present along the surface of the semiconductor body 10.

The window 41 and the loop 43 are positioned so that the loop 43 extends into the coaxial line 30 at a point adjacent to the semiconductor body 10 in a maximum magnetic field area for the particular harmonic frequency signal $F_N$ to be selected. The selected harmonic frequency $F_N$, as well as any other harmonic frequency signals having a maximum magnetic field at the location of the loop 43, will be propagated in the coaxial line 38 and fed to the filter 37. The filter 37 functions to select the desired harmonic frequency signal $F_{N_1}$ and to feed the selected harmonic frequency signal to a utilization circuit.

The dimensions of the window 43 may be determined with respect to the size of the choke 42 so that only the desired, selected harmonic frequency signal $F_{N_1}$ is propagated in the coaxial line 38. Further, a probe may be used in place of the magnetic loop 43 to capacitively couple the coaxial line 38 into the coaxial line 30 at the point where the electric field of the selected harmonic frequency signal $F_{N_1}$ is at a maximum. The use of either loops or probes in such coupling arrangements is known. If modulating signal energy is supplied by the source 14 in addition to or in place of the bias voltage supplied by the battery 12, the output signal fed from the filter 37 will be amplitude modulated according to the modulating signal energy in the manner previously described. If a modulated input signal is supplied by the source 11, in addition to the modulating signal energy supplied by the source 14, a double modulation system will result. The operation of the embodiment shown in FIG. 5 as a modulation system is the same as that of the embodiment given in FIG. 1. Any number of additional output circuits each selective to a different harmonic frequency signal and including a coaxial line and filter may be coupled to the coaxial line 30. For example, a second output circuit including a filter 44 selective to the harmonic frequency signal $F_{N_2}$ and a coaxial line 45 is shown coupled to the coaxial line 30 at a point opposite to the first output circuit just described.

The harmonic generator of the invention is especially useful at high frequencies. The charge carriers, holes or electrons, are majority charge carriers. For example, in the case of N-type germanium, the charge carriers are electrons. The operating frequency of the invention is therefore not limited by carrier life-time or by the carrier drift velocity, as in the case of drift transistors, for example. Another advantage of the invention is that the input capacitance to the semiconductor body 10 is relatively low, also making the invention useful at high frequencies.

Figure 6:
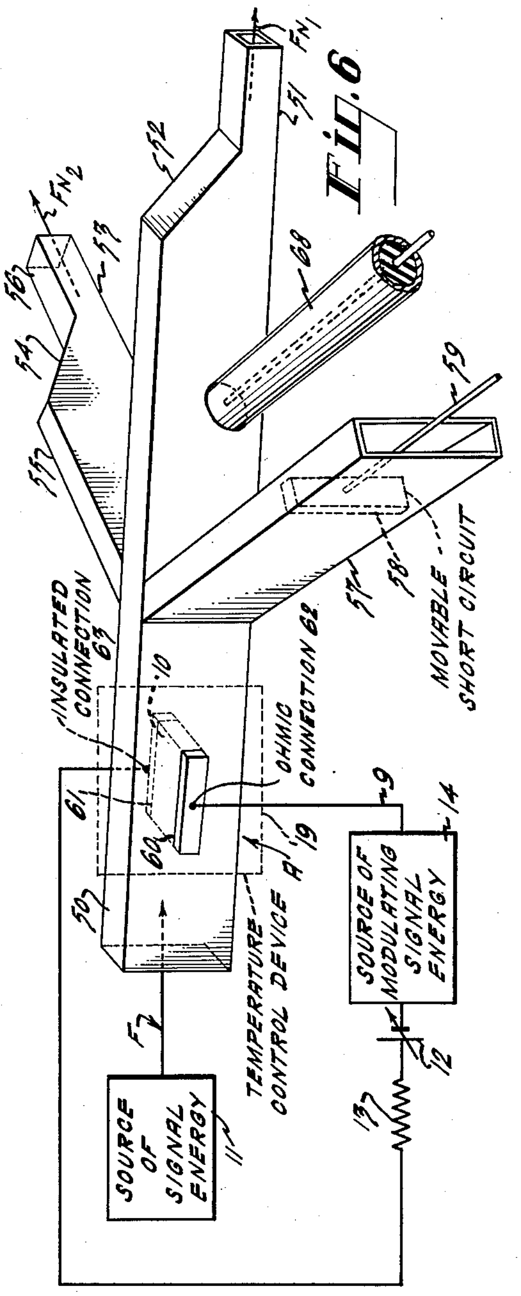
FIG. 6 is a circuit diagram of still another embodiment of the invention as applied to a waveguide arrangement.

One application of the invention to high frequency operation is shown in FIG. 6. A waveguide arrangement is shown which is capable of operation at microwave powers in the frequency range, for example, of three thousand megacycles per second and higher. A metallic, waveguide section 50 is provided which may be constructed of copper or brass coated with silver to minimize losses. While a rectangularly shaped waveguide 50 is shown, the waveguide 50 may be of other shapes as understood in the art. The waveguide 50 is shown as feeding into a further waveguide section 51 of dimensions sufficient to support a selected harmonic frequency signal $F_{N_1}$ propagated along the waveguide 50 in a manner to be described. A tapered section 52 is provided between the waveguides 50 and 51 to provide the necessary transition therebetween. The waveguide 51 is connected to a utilization circuit responsive to the signal $F_{N_1}$ to perform a desired function.

A second waveguide section 53 of the same shape and construction as the waveguide 50 is shown affixed at a predetermined angle to a first side of the waveguide 50. The waveguide 53 includes a tapered section 54 constructed so as to provide a proper transition from a larger area section 55 of the waveguide 53 nearest the waveguide 50 to a smaller area or output section 56 thereof. The output section 56 of the waveguide 53 is of the proper dimensions to support a harmonic frequency signal $F_{N_2}$ propagated along the waveguide 50 in a manner to be described. A utilization circuit is connected to the section 56 of the waveguide 53 and is responsive to the signal $F_{N_2}$ to perform a desired function. A further waveguide section 57 is affixed at a predetermined angle to the second side of the waveguide 50 at a point opposite the waveguide 53. A shorting member 58 of metallic construction is mounted in the waveguide 57 and is arranged to be movably positioned in the waveguide 57 by means of a rod 59 or similar member.

The construction of the waveguides 50, 51, 53 and 57 and the method of connecting the respective waveguides to form the arrangement shown in FIG. 6 is known in the art. The invention is not limited to the particular waveguide construction shown and other constructional arrangements may be used without departing from the spirit thereof. For example, a discussion of waveguides, waveguide junctions, tapered sections, and so on, may be found in "Principles and Applications of Waveguide Transmission"—Southworth, published by Van Nostrand Company, and in other publications.

According to the invention, a pair of slots or windows 60, 61 are provided at the center of the opposite sides of the waveguide 50. The windows 60, 61, are arranged along an imaginary center line drawn along the longitudinal axis of the waveguide 50. The extrinsic type of semiconductor body 10 according to the invention is positioned through the windows 60, 61 so as to be mounted at the center of and in the area of the maximum electric field present in the waveguide 50. The semiconductor body 10 is mounted in electrical contact with the waveguide 50 at the window 60 and is insulated from the waveguide 50 at the window 61 to prevent a short circuit across the waveguide 50. A direct current path is completed through the semiconductor body 10 including an ohmic connection 62 at the window 60, lead 9, the source of modulating signal energy 14, battery 12, resistor 13 and an insulated connection 63 at the window 61.

Figure 7:
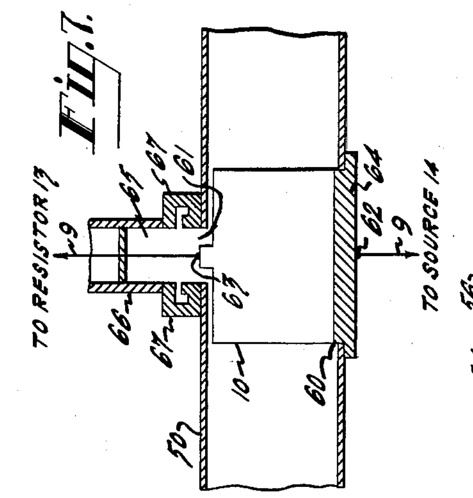
FIG. 7 is a detailed view of the embodiment given in FIG. 6, in part, taken in the direction of the arrow A and showing one way in which the semiconductor body may be mounted in the waveguide.

FIG. 7 is a detailed view taken in the direction of the arrow A in FIG. 6 and shows one way in which the semiconductor body 10 may be mounted in the waveguide 50. Referring to FIG. 7, one end of the semiconductor body 10 is attached to a metallic plug or member 64. The member 64 can be made of copper or brass and can be silver coated to minimize losses. The window 60 and the member 64 are made of the proper relative dimensions such that the semiconductor body 10 can be passed through the window 60 and into the waveguide 50. When the semiconductor body 10 is completely inserted in the waveguide 50, the member 64 is pushed into the window 60 so as to make a tight, secure engagement with the walls of the window 60. For this purpose, the dimensions of the member 64 adjacent the semiconductor body 10 may be made slightly larger than the dimensions of the window 60. Various soldering procedures may be used to insure a firm electrical contact between the waveguide 50 and the member 64. The lead 9 is connected to the member 64 to the ohmic connection 62 by soldering or by some other known means.

In completing the direct current path, the lead 9 passes through the window 61 as the inner conductor of a coaxial line section 65 and is connected by soldering to the unsupported end of the semiconductor body 10 at the insulated connection 63. The outer conductor 66 of the coaxial line section 65 is connected through a metallic choke 67 to the waveguide 50. The choke 67 is constructed so as to effectively cancel out the discontinuity introduced in the waveguide 50 by the window 61 for the fundamental radio frequency. The choke 67 is usually one-half wavelength long for the fundamental radio frequency propagated in the waveguide 50. The semiconductor body 10 is therefore suspended in the waveguide 50 between the lead 9 and the member 64. Other arrangements for mounting the semiconductor body 10 in the waveguide 50 may be used without departing from the spirit of the invention. As in the case of the embodiments previously described, the semiconductor body 10 when mounted in the waveguide 50 will be maintained in a temperature controlled atmosphere as produced by the temperature control device 19.

In operation, the bias source represented by battery 12 and the temperature control device 19 are adjusted so that the semiconductor body 10 is at or near its high point of resistivity. The source of signal energy 11 functions to supply a radio frequency signal F of given frequency as an electromagnetic wave which is propagated along the waveguide 50. The short circuit represented by the movable member 58 in the waveguide 57 is adjusted so as to cancel out the discontinuity for the input signal F introduced in the waveguide 50 by the presence of the window or hole at the point where the section 55 of the waveguide 53 is connected to the side of the waveguide 50. The member 58 tunes the waveguide 50 so that the incident radio frequency energy produced by the discontinuity is absorbed. The semiconductor body 10 is located in the plane of the maximum electric field in the waveguide 50, for the input signal F of given frequency, permitting the maximum efficiency of operation to be achieved at the lowest power of the input signal F.

The bias supplied by the battery 12 is adjusted according to the operation desired so that the semiconductor body 10 is driven beyond the breakdown point thereof and "impact ionization" occurs during predetermined periods of the input signal F. Since the semiconductor body 10 is located at the center of or, in other words, in the plane of the maximum electric field of the electromagnetic wave propagated along the waveguide 50, the variations in the electric field of the electromagnetic wave corresponding to the variations in the voltage amplitude of the input signal F appear across the semiconductor body 10. The operation of the semiconductor body 10 in the embodiment of FIG. 6 is exactly the same as in the embodiments given in FIGS. 1 and 5. In all cases, whether the signal energy be supplied over a direct current path as in FIG. 1 or as an electromagnetic wave as in FIG. 6, the variations in the voltage amplitude of the input signal F will occur as corresponding variations in the amplitude of the voltage developed across the semiconductor body 10.

Because of the sharp non-linearities in the current versus voltage characteristic of the semiconductor body 10, rectification of the input signal F takes place and a number of harmonic frequency signals $F_N$ are produced. As indicated by the above table, the number and amplitude of the harmonic frequency signals so produced is determined according to the amplitude of the input signal F and of the bias voltage supplied by the battery 12. The fundamental frequency signal F, as well as the harmonic frequency signals $F_N$, appear at different wavelengths along the semiconductor body 10 and are propagated along the waveguide 50. The waveguide sections 51 and 53 are each responsive to the electromagnetic wave energy propagated along the waveguide 50 to feed a different selected one of the harmonic frequency signals $F_N$ to a utilization circuit. Waveguide 51 is shown as selective to a harmonic frequency signal $F_{N_1}$, while the waveguide 53 is shown as selective to a different harmonic frequency signal $F_{N_2}$. Any number of additional waveguides of different sizes, not shown, may be provided to supply selected ones of the harmonic frequencies $F_N$ available to different utilization circuits. As understood in the art, a coaxial line 68 may be connected to the waveguide 50 by either a probe or loop coupling means, not shown, and arranged to carry all or certain selected ones of the frequency signals propagated along the waveguide 50 to utilization circuits. A choke or other means, not shown, is provided to effectively cancel out the discontinuity introduced in the waveguide 50 by the connection of the coaxial line 68.

If modulated signal energy is supplied by the source 11, the harmonic frequency signals $F_{N_1}$ and $F_{N_2}$ available at the waveguides 51 and 53, respectively, are modulated in a similar manner. Upon modulating signal energy being supplied by the source 14, the harmonic frequency signals propagated along the waveguide 50 are, in the manner previously described, amplitude modulated according to the modulating signal energy so supplied. If modulated signal energy is supplied by the source 11 and modulating signal energy is supplied by the source 14, a double modulation system is provided. The bias voltage supplied by the battery 12, the voltage amplitude of the modulating signal energy supplied by the source 14 and the voltage amplitude of signal energy supplied by the source 11 can be adjusted to the proper relationship so as to provide the operation desired. As pointed out above, the bias voltage supplied by the battery 12 may in certain conditions be zero. The operation of the semiconductor body 10 in the embodiment of FIG. 6 can be modified in the same manner as has been described in connection with the embodiments given in FIGS. 1 and 5.

Figure 8:
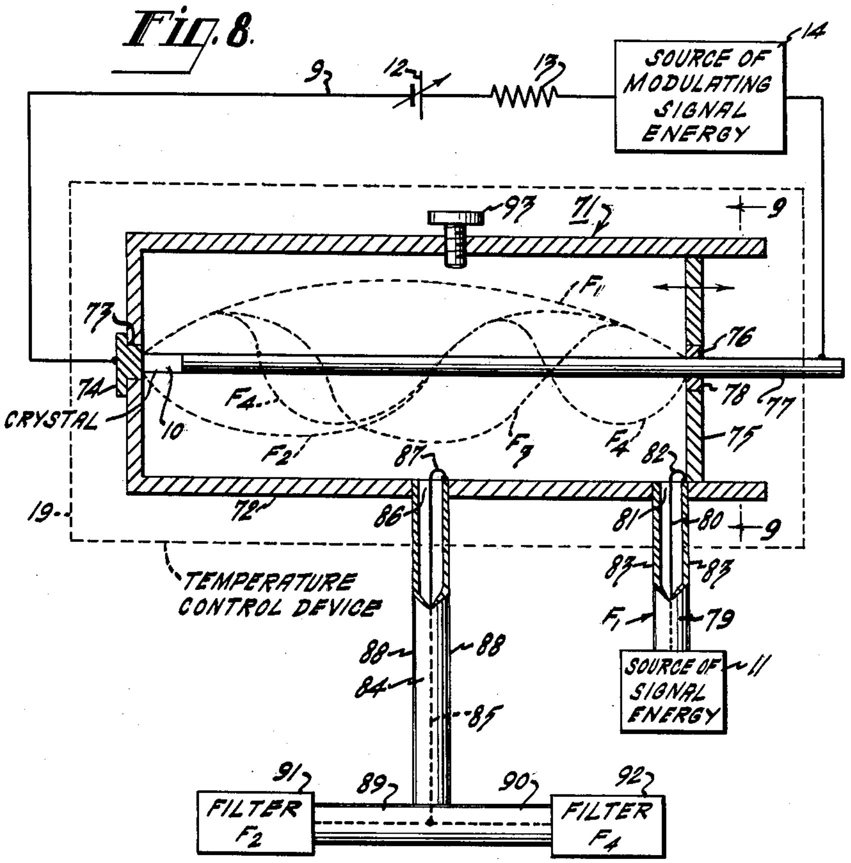
FIG. 8 shows a schematic view of still another embodiment of the invention as applied to a coaxial cavity resonator arrangement.

FIG. 8 shows a schematical view of a further application of the invention to high frequency operation and in particular shows an application of the invention to a coaxial cavity resonator. An end view of the coaxial cavity resonator taken along line 9—9 of FIG. 8 is given in FIG. 9. The cavity resonator, indicated generally by the reference 71, includes a cylindrical member or outer conductor 72 which is closed at one end. The member 72 is constructed of copper or brass and is silver coated to minimize losses. An aperture or hole 73 is provided at the center of the closed end. An extrinsic type of semiconductor body 10 according to the invention is electrically connected at one end by soldering or other means to a metallic plug or member 74 having the same dimensions as or slightly larger dimensions than the aperture 73. The plug 74 may be made of brass or copper silver coated to minimize losses. In assembly, the semiconductor body 10 is passed through the aperture 73 and into the cavity of the resonator 71. The plug 74 is inserted into the aperture 73 so that a firm electrical connection is made. Soldering or other techniques may be used to produce a firm contact between the plug 74 and the member 72 of the resonator 71.

A metallic circularly shaped plate member or disc 75 constructed of silver coated brass or copper is positioned in the open end of the resonator 71. The dimensions of the disc 75 are chosen so that the position thereof at the open end of the resonator 71 can be adjusted. A good electrical contact should be maintained between the edge surface of the disc 75 and the member 72 of the resonator 71. Short metallic fingers or an annular metallic member, not shown, may be secured to the disc 75 so as to engage the inner surface of the member 72 under tension, providing a continuous electrical connection between the disc 75 and the member 72.

An aperture or hole 76 is provided at the center of the disc 75. An inner conductor in the form of a rod 77 or similar member is passed through the hole 76 so that the rod 77 extends along the center of the resonator 71. The rod 77 may be made of silver coated brass or copper.

The ratio of the diameter of the inner conductor 77 to the diameter of the inner surface of the outer conductor or member 72 should be chosen to minimize losses. The end of the rod 77 located in the cavity of the resonator 71 is connected by soldering or other means to the end of the semiconductor body 10 opposite that connected to the plug 74. A ring 78 of direct current insulating material is positioned in the aperture 76 between the rod 77 and the disc 75 so as to prevent a direct current short circuit across the member 72. By way of example, the ring 78 may be constructed of mica or of a material known in the art as Teflon.

A direct current path is completed including the semiconductor body 10, rod 77, lead 9, the source of modulating signal energy 14, resistor 13 and the adjustable battery 12. The lead 9 is connected to the plug 74 and to the rod 77 by soldering or by other known techniques.

The source of signal energy 11 of a frequency $F_1$ is connected to the member 72 by a section of coaxial line 79. The coaxial line 79 includes an inner conductor 80 which is passed through a window 81 in the side of the member 72 and connected to the member 72 so as to form a loop 82 extending into the cavity of the resonator 71. The outer conductor 83 of the coaxial line 79 is connected to the member 72 so as to provide a good electrical connection therebetween.

Selected harmonic frequency signals produced in the resonator 71 are fed from the resonator 71 to utilization circuits by means of a coaxial line section 84. The inner conductor 85 of the coaxial line 84 is passed through a window 86 in the member 72 and connected to the member 72 so as to form a loop 87 which extends into the cavity of the resonator 71. The outer conductor 88 of the coaxial line 84 is connected to the member 72 so as to provide a good electrical connection therebetween. The coaxial line 84 is divided into two sections 89, 90 by a conventional coaxial dividing network such that the signal energy carried over the coaxial line 84 is simultaneously applied over the respective line sections 89, 90 to a pair of filter circuits 91, 92. The filter circuits 91, 92 are each selective to a different frequency signal carried over the coaxial line 84 and function to feed the selected signals to utilization circuits connected thereto.

A screw 93 is mounted in the wall of the member 72 opposite the window 86 so that by turning the screw 93 the end thereof is moved into or out of the cavity of the resonator 71. The dimensions of the resonator 71 are in the order of centimeters, and the entire resonator 71 may be supported in a Dewar flask or other similar type of temperature control device 19. The connections between the coaxial lines 84, 79 and the member 72 should be sufficiently tight to prevent the leakage of the cooling medium into the cavity of the resonator 71.

Figure 9:
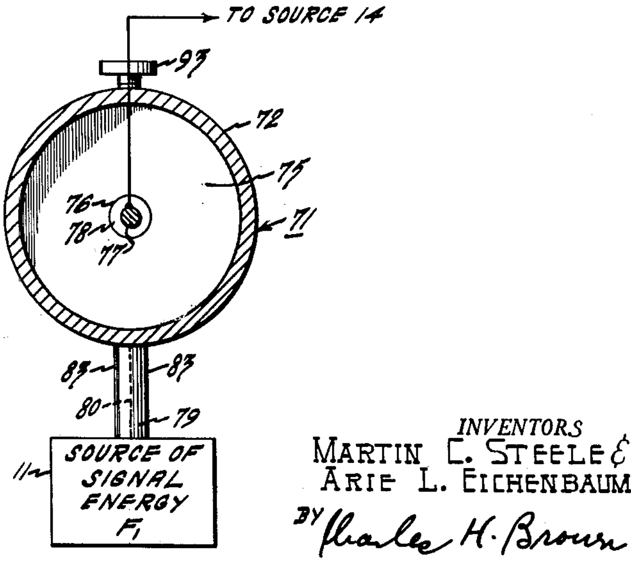
FIG. 9 is an end view of the embodiment given in FIG. 8 taken along line 9—9 of FIG. 8.

In the operation of the embodiment given in FIGS. 8 and 9, the source 11 is operated to apply a signal $F_1$ of given frequency to the resonator 71 by means of the coaxial line 79 and the magnetic loop 82. The disc 75 is adjusted to a position at the end of the member 72 according to the formula $n$ times the wave-length of a signal in the resonator 71 divided by two, where $n$ for the fundamental frequency $F_1$ equals one or unity. In other words, the length of the cavity in the resonator 71 is adjusted by positioning the disc 75 so that the fundamental frequency $F_1$, as indicated by the dotted line, is supported in the resonator 71. Since a longer wavelength can not be supported in the cavity of the resonator 71, the resonator 71 is cut off for all frequencies less than the fundamental frequency $F_1$. The disc 75 is positioned to match the resonator 71 to the input signal $F_1$ supplied by the source 11. The screw 93 is adjusted to introduce a discontinuity in the resonator 71 for the fundamental frequency signal $F_1$ opposite to the discontinuity introduced in the resonator 71 for the fundamental frequency signal $F_1$ by the window 86 and loop 87. Since the window 81 and loop 82 are positioned near the wall of the resonator 71, the discontinuity introduced thereby for the fundamental frequency signal $F_1$ is relatively small and need not be compensated.

The bias voltage supplied by the battery 12 and the temperature of the atmosphere surrounding the semiconductor body 10 are adjusted so that the semiconductor body 10 is at or near the high point of resistivity. Since the wave energy introduced into the cavity of the resonator 71 varies according to the input signal $F_1$, the voltage applied across the semiconductor body 10 will vary according to the fundamental frequency signal $F_1$. The bias voltage supplied by the battery 12 is set to cause the semiconductor body 10 to be driven beyond the breakdown point during predetermined periods of the input signal $F_1$ or, in other words, when the voltage amplitude of the input signal $F_1$ exceeds a predetermined value. The "impact ionization" of the impurities in the semiconductor body 10 during the predetermined periods results in the rectification of the input signal $F_1$ and the production of harmonic frequency signals $F_2$, $F_3$, $F_4$, and so on. The harmonic frequency signals $F_2$, $F_3$, and $F_4$ so produced are indicated by dotted lines. It has been assumed that the filters 91 and 92 are selective to the harmonic frequency signals $F_2$ and $F_4$, respectively. The magnetic loop 87 is therefore located in the maximum magnetic field (minimum electric field) for these frequencies. The selected harmonic frequency signals are picked up by the loop 87 and propagated along the coaxial line 84. Instead of providing for two separate output circuits, the size of the window 86 may be determined so that only one of the harmonic frequency signals $F_2$ or $F_4$ is propagated along the coaxial line 84, and so on. While only a single output circuit arrangement is shown, any number of additional output circuits may be similiarly coupled to the resonator 71. Each of the additional output circuits is connected to the member 72 at the point of maximum magnetic field for the particular harmonic frequency signal selected.

The operation of the resonator 71 as a modulation system is similar to that of the embodiments of the invention previously described. Upon the bias voltage supplied to the semiconductor body 10 being varied according to modulating signal energy supplied by the source 14, the harmonic frequency signals produced will be amplitude modulated according to the modulating signal energy. The amplitude of the harmonic frequency signals will vary as a function of the changes in the difference between the level of the bias voltage and the breakdown point of the semiconductor body 10. If a modulated input signal is supplied by the source 11 and modulating signal energy is supplied by the source 14, a double modulation system results. The operation of the embodiment given in FIGS. 8 and 9 is similar to that of the coaxial line arrangement given in FIG. 5, differeing only in that the cavity coaxial resonator of FIGS. 8 and 9 is capable of higher frequency operation.

Figure 10:
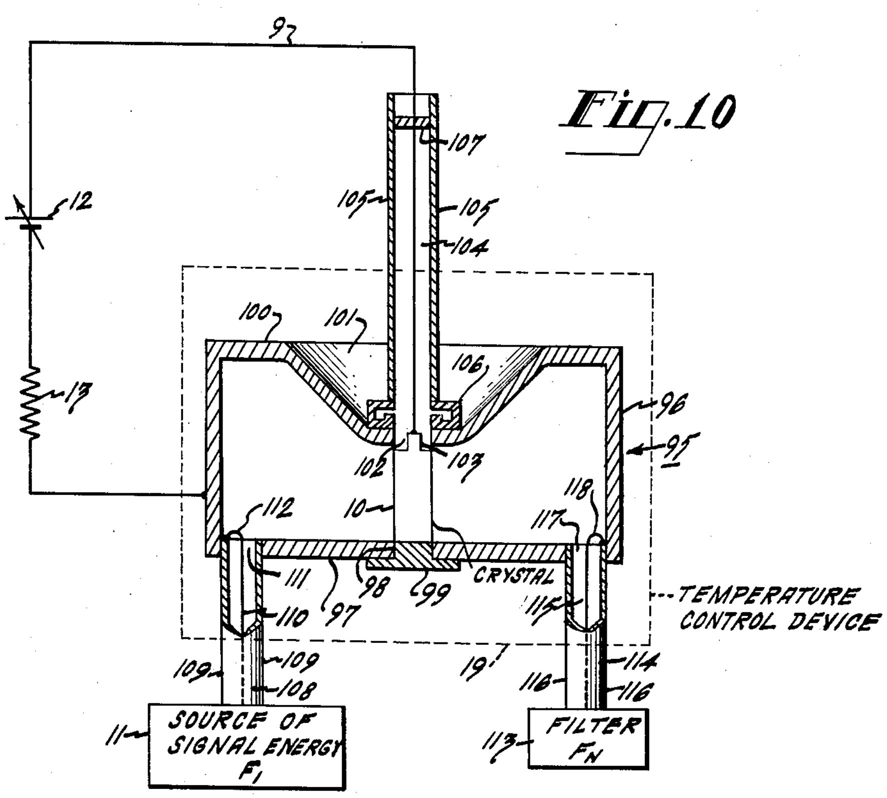
FIG. 10 shows a schematical view of still another embodiment of the invention as applied to a cavity resonator.
Figure 11:
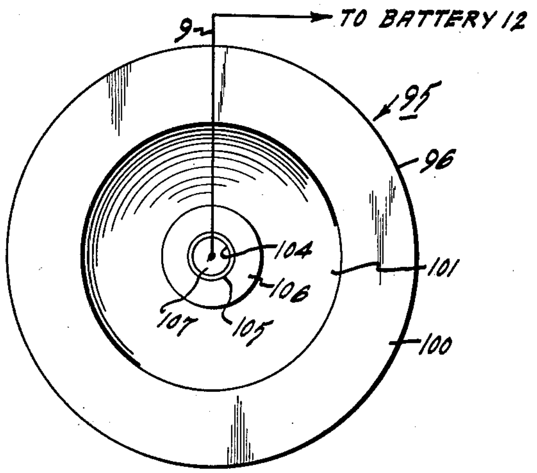
FIG. 11 is a plan view of the embodiment given in FIG. 10.

The invention is readily adaptable for use in connection with a number of different types of known cavity resonators. Referring to FIG. 10, there is shown a sectional view of an application of the invention to a cavity resonator of the type having a boundary condition. FIG. 11 is a plan view of the cavity resonator of FIG. 10. The cavity resonator, indicated gnerally by the reference 95, includes a cylindrical member 96 constructed of silver coated brass or copper. One end of the member 96 is enclosed by a level, circularly shaped plate member 97 constructed of the same material as the member 96. An aperture or hole 98 is located at the center of the member 97. An extrinsic type of semiconductor body 10 according to the invention is connected by soldering or by other means to a metallic plug or member 99. The plug 99 is constructed of silver coated brass or copper and is arranged to be securely positioned in the aperture 98 so that the semiconductor body 10 extends into the cavity of the resonator 95. Soldering or other known techniques may be used to insure a good electrical connection between the plug 99 and the member 97.

The other or upper end of the member 96 is enclosed by a circularly shaped plate member 100 constructed of the same material as the member 96. The center area of the member 100 is recessed so as to form a surface area 101 generally conical in configuration and having an apex located at the end of the semiconductor body 10 situated within the cavity of the resonator 95. While the resonator 95 has been described as having two end members 97, 100 and a cylindrical member 96, the resonator 95 may, in practice, be of a single or unitary construction. The resonator 95 may be constructed in a single operation as by stamping, and so on. A window 102 is located in the member 100 at the apex of the surface area 101. As shown in the drawing, the semiconductor body 10 may be constructed to have a raised portion 103 which extends through the window 102. This construction serves to reduce the discontinuity for the fundamental frequency introduced in the resonator 95 by the presence of the end of the semiconductor body 10.

A direct current path is completed through the semiconductor body 10 including lead 9, the adjustable battery 12, resistor 13, member 96 and plug 99. The lead 9 is connected to the raised portion 103 of the semiconductor body 10 and to the member 96 by soldering or other known techniques. The lead 9 may, of course, be connected directly to the plug 99 rather than to the member 96. The lead 9 forms the inner conductor of a coaxial line section 104. The coaxial line 104 includes an outer conductor 105 connected through a metallic choke 106 to the member 100. The choke 106 functions to effectively cancel out the discontinuity for the fundamental frequency introduced in the resonator 95 by the window 102. A termination represented by a metallic disk 107 is provided at the end of the coaxial line 104.

A source of signal energy 11 is connected to the resonator 95 by a coaxial line section 108 having an inner conductor 110 and an outer conductor 109. A window 111 is located in the member 97 at the wall of the member 96. The inner conductor 110 is passed through the window 111 and connected to the member 96 so as to form a magnetic loop 112 extending into the cavity of the resonator 95. The outer conductor 109 is connected to the member 97.

An output circuit is provided in the form of a filter circuit 113 selective to a particular harmonic frequency signal $F_N$. The filter circuit 113 is connected to the resonator 95 by a coaxial line section 114. The coaxial line section 114 includes an inner conductor 115 and an outer conductor 116. A window 117 is located in the member 97 at the wall of the member 96. The inner conductor 115 is passed through the window 117 and connected to the member 96 so as to form a magnetic loop 118 extending into the cavity of the resonator 95. The outer conductor 116 is connected to the member 97.

The resonator 95 is constructed to be resonate at or, in other words, support the frequency of the input signal supplied by the source. The actual dimensions of the resonator 95 in a particular application can be readily determined using known procedures. Since for high frequency operation in the megacycles range the dimensions of the resonator 95 are in the order of centimeters, the entire assembly of the resonator 95 can be suspended in a temperature control device 19 such as a Dewar flask, and so on.

In operation, a given frequency signal $F_1$ is magnetically coupled to the resonator 95 from the source 11 by means of the loop 112. The presence of the boundary condition in the form of the surface area 101 results in the production within the cavity of the resonator 95 of harmonic frequency signals of the fundamental signal $F_1$. The temperature control device 19 and the battery 12 are adjusted to place the semiconductor body 10 at or near the breakdown point (the point of high resistivity). The bias voltage supplied by the battery 12 is adjusted so that the breakdown point is exceeded each time the voltage amplitude of the input signal $F_1$ exceeds a predetermined level, causing "impact ionization" to occur. The input signal $F_1$ is rectified and harmonic frequency signals are produced. The harmonic frequency signals so produced tend to add to the harmonic frequency signals present in the cavity of the resonator 95. This action functions to enhance or amplify the harmonic frequency signals present in the cavity of the resonator 95.

The magnetic loop 118 is located along the wall of the member 96 at the point of maximum magnetic field for the particular harmonic frequency signal $F_N$ selected, resulting in the propagation of the desired harmonic frequency signal $F_N$ along the coaxial line 114. The filter circuit 113 functions to forward the selected harmonic frequency signal $F_N$ to a utilization circuit. While only a single output circuit is shown, any number of additional, similar output circuits may be provided around the wall of the member 96. In each case, the output circuit is magnetically coupled to the cavity of the resonator 95 at the point of maximum magnetic field for the harmonic frequency signal selected. An arrangement is provided according to the invention capable of producing high power harmonic frequency signals which can be readily picked up and utilized by practical circuits.

While certain specific embodiments of the invention have been described, the invention is not to be considered as limited thereto. The harmonic generator of the invention is readily adaptable for use in a wide range of applications. It is capable of handling much greater instantaneous power, greater continuous power and pulses of greater width for a given input signal than previously known generators. The input capacitance of the semiconductor body used can be made as low as desired (below 1 micromicrofarad) by appropriate length and cross sectional area, according to the formula $$C=\frac{\epsilon \cdot A}{l}$$

where A equals cross sectional area, $l$ equals length and $\epsilon$ equals dielectric constant (total). It can be made to easily give a capacitance equal to or less than 0.3 micromicrofarads which is below that of common point contact silicon diodes.

The high back resistance and low capacitance of the semiconductor body make the invention particularly desirable in applications where high power switching is involved and low leakage is desired such as radar. A harmonic generator constructed according to the invention is mechanically stronger than previously known diodes due to the type of connections made, and so on, and can better withstand shocks. It has a long lifetime as compared to vacuum type devices or point contact diodes. The necessity of frequent checks of the semiconductor body is, therefore, eliminated. A wide range of applications are possible since the semiconductor body may be made in any shape desired and requires only one direct current potential for its operation. As described, the construction and operation of the invention make it particularly suitable for use in applications where it is desired to provide a harmonic frequency signal (of a fundamental frequency signal) modulated according to given modulating signal energy.

What is claimed is:

1. A harmonic generator comprising, in combination, a body of only a single type of semiconductive material having impurities contained therein and which exhibits a sharp change in resistivity due to impact ionization under predetermined conditions of temperature and applied electric field, means for applying a voltage to said body to produce an electric field in said body, means for adjusting the temperature of said body to said predetermined temperature condition, the voltage applied to said body being determined so that a further increase of given amount in the voltage applied to said body results in said sharp change in resistivity, means external to said body for applying an input signal of a given frequency to said body to cause an increase in the voltage applied to said body of at least said given amount during at least a portion of the input signal, said body operating as a result of said sharp change in resistivity to rectify said input signal and to produce additional signals each of a frequency harmonically related to said given frequency, and an output circuit including frequency selecting means coupled to said body and selective to a predetermined one of said harmonic frequency signals.

2. A harmonic generator as claimed in claim 1 and wherein said means external to said body for applying said input signal to said body is arranged to apply said input signal to said body as an electric field.

3. A harmonic generator as claimed in claim 1 and wherein said means external to said body for applying said input signal to said body is arranged to apply said input signal to said body as an electromagnetic field.

4. A harmonic generator comprising, in combination, a body of a single type of semiconductive material having impurity substances contained therein and which exhibits a sharp change in resistivity due to impact ionization under predetermined conditions of temperature and applied electric field, means for applying a bias voltage to said body to produce an electric field in said body, means for adjusting the temperature of said body to said predetermined temperature condition, the bias voltage applied to said body being determined so that a further increase of given amount and in a given sense of the voltage applied to said body results in said sharp change in resistivity, means external to said body for applying an input signal of given frequency to said body to cause a voltage to be applied to said body which varies according to a parameter of said input signal, means for varying the bias voltage applied to said body according to a parameter of a second input signal such that the total voltage applied to said body increases in said sense and at least in said given amount to cause said sharp change in resistivity during at least a portion of said first input signal, said body operating as a result of said sharp change in resistivity to rectify said first input signal and to produce an output signal representative of said first input signal and additional signals each of a frequency harmonically related to said given frequency amplitude modulated according to said second input signal, and an output circuit including frequency selecting means coupled to said body and arranged to select a predetermined one of said modulated harmonic frequency signals for application to a utilization circuit.

5. A harmonic generator comprising, in combination, a body of a single type of semiconductive material having impurity substances contained therein and which exhibits a sharp change in resistivity due to impact ionization under predetermined conditions of temperature and applied voltage, a first source of bias voltage, means for connecting said first source and said body in series to provide a direct current path through said body, means for adjusting the temperature of said body to said predetermined temperature condition, the bias voltage applied to said body from said first source being determined so that a further change of given amount in the voltage applied to said body results in said sharp change in resistivity, a second source of signal energy in the form of an input signal of given frequency connected in series with said first source and said body and arranged to apply said input signal to said body over said path, said input signal having a voltage amplitude sufficient to cause a voltage to be applied from said second source to said body of at least said given amount to bring about said sharp change in resistivity during at least a portion of said input signal, said body operating as a result of said sharp change in resistivity to rectify said input signal and to produce additional signals each of a frequency harmonically related to said given frequency, a tuned circuit resonant at a predetermined one of said harmonic frequency signals connected directly to said body by means separate from said series connecting means, and means connected to said tuned circuit for applying said predetermined harmonic freqency signal from said circuit to a utilization circuit.

6. A harmonic generator comprising, in combination, a section of coaxial transmission line having an inner and outer conductor, a body of a single type of semiconductive material having impurity substances contained therein and which exhibits a sharp change in resistivity due to impact ionization under predetermined conditions of temperature and applied voltage connected in said inner conductor, a first source of bias voltage, means including said inner conductor for connecting said first source in series with said body to provide a direct current path through said body, means for adjusting the temperature of said body to said predetermined temperature condition, the bias voltage applied to said body from said first source being determined so that a further change of given amount in the voltage applied to said body results in said sharp change in resistivity, a second source of signal energy in the form of an input signal of given frequency connected to said coaxial line and arranged to apply said input signal over said coaxial line to said body, said input signal having a voltage amplitude sufficient to cause a voltage to be applied from said second source to said body of at least said given amount to bring about said sharp change in resistivity during at least a portion of said input signal, said body operating as a result of said sharp change in resistivity to rectify said input signal and to produce additional signals each of a frequency harmonically related to said given frequency, and an output circuit coupled to said coaxial line at a point adjacent said body and arranged to select a predetermined one of said harmonic frequency signals for application to a utilization circuit.

7. A harmonic generator comprising, in combination, a section of hollow waveguide, a body of a single type of semi-conductive material having impurity substances contained therein and which exhibits a sharp change in resistivity due to impact ionization under predetermined conditions of temperature and applied voltage mounted in said waveguide, a first source of bias voltage, means for connecting said first source in series with said body, means for adjusting the temperature of said body to said predetermined temperature condition, the bias voltage applied to said body from said first source being determined so that a further change of given amount in the voltage applied to said body results in said sharp change in resistivity, a second source of signal energy in the form of an input signal of given frequency coupled to one end of said waveguide and arranged to apply said input signal as an electromagnetic field through said waveguide to said body, said input signal having a voltage amplitude sufficient to cause a voltage to be applied to said body of at least said given amount during at least a portion of said input signal to bring about said sharp change in resistivity, said body operating as a result of said sharp change in resistivity to rectify said input signal and to produce additional signals in said waveguide which are each of a frequency harmonically related to said given frequency, and means including separate waveguide sections connected to the other end of said waveguide and arranged to select different ones of said harmonic frequency signals for application to separate utilization circuits.

8. A harmonic generator comprising, in combination, a coaxial cavity resonator having an inner and outer conductor, a body of a single type of semiconductive material having impurity substances contained therein and which exhibits a sharp change in resistivity due to impact ionization under predetermined conditions of temperature and applied voltage connected in that part of said inner conductor located in said cavity, a first source of bias voltage, means including said inner conductor for connecting said first source in series with said body to provide a direct current path through said body, means for adjusting the temperature of said body to said predetermined temperature condition, the bias voltage applied from said first source to said body being determined so that a further change of given amount in the voltage applied to said body results in said sharp change in resistivity, second source of signal energy in the form of an input signal of given frequency coupled to the cavity of said resonator and arranged to apply said input signal as an electromagnetic field through the cavity of said resonator to said body, said input signal having a voltage amplitude sufficient to cause a voltage to be applied to said body of at least said given amount during at least a portion of said input signal to bring about said sharp change in resistivity, said body operating as a result of said sharp change in resistivity to rectify said input signal and to produce in the resonant cavity additional signals each of a frequency harmonically related to said given frequency, and an output circuit coupled to the cavity of said resonator and arranged to be selective to a predetermined one of said harmonic frequency signals for applying said predetermined harmonic frequency signal to a utilization circuit.

9. A harmonic generator comprising, in combination, a cavity resonator having a boundary condition, a body of a signal type of semiconductive material having impurity substances contained therein and which exhibits a sharp change in resistivity due to impact ionization under predetermined conditions of temperature and applied voltage mounted in said cavity, a first source of bias voltage, means for connecting said first source and said body in series to provide a direct current path through said body, means for adjusting the temperature of said body to said predetermined temperature condition, the bias voltage applied to said body from said first source being determined so that a further change of given amount in the voltage applied to said body results in said sharp change in resistivity, a second source of signal energy in the form of an input signal of given frequency coupled to the cavity of said resonator and arranged to apply said input signal as an electromagnetic field through said cavity to said body, said boundary condition causing additional signals to be produced in the resonant cavity each of a frequency harmonically related to said given frequency, said input signal having a voltage amplitude sufficient to cause upon the application of said input signal into the cavity of said resonator a voltage to be applied to said body which is at least of said given amount during at least a portion of said input signal to bring about said sharp change in resistivity, said body operating as a result of said sharp change in resistivity to rectify said input signal and to produce in said cavity signals each of a frequency harmonically related to said given frequency such that the said harmonic frequency signals produced by said body enhance the corresponding harmonic frequency signals produced by said boundary condition, and an output circuit including frequency selecting means coupled to the cavity of said resonator and arranged to select a predetermined one of said harmonic frequency signals for application to a utilization circuit.

References Cited in the file of this patent

UNITED STATES PATENTS

| | | |
|---|---|---|
| 1,998,119 | Cox | Apr. 16, 1935 |
| 2,189,122 | Andrews | Feb. 6, 1940 |
| 2,216,265 | Farnsworth | Oct. 1, 1940 |
| 2,460,109 | Southworth | Jan. 25, 1949 |
| 2,533,908 | Andrews | Dec. 12, 1950 |
| 2,553,490 | Wallace | May 15, 1951 |
| 2,659,868 | Ericsson et al. | Nov. 17, 1953 |
| 2,725,474 | Ericsson, et al. | Nov. 29, 1955 |
| 2,736,822 | Dunlap | Feb. 28, 1956 |
| 2,860,322 | Stadler | Nov. 11, 1958 |

OTHER REFERENCES

Physical Review, vol. 91, pp. 215–216; 1953, Low Temperature "Breakdown" Effect in Germanium, by Sclar, Burstein, Turner and Davisson.

Physical Review, vol. 92, p 858; 1953, by Sclar, Burstein and Davisson.

Physical Review, June 1955; pp. 1757-60.